(12) United States Patent
Ta (10) Patent No.: US 9,336,554 B2
(45) Date of Patent: May 10, 2016

(54) SOCIAL NETWORK SYSTEM AND METHOD

(71) Applicant: Jenny Q. Ta, Fountain Valley, CA (US)

(72) Inventor: Jenny Q. Ta, Fountain Valley, CA (US)

( * ) Notice: Subject to any disclaimer, the term of this patent is extended or adjusted under 35 U.S.C. 154(b) by 0 days.

(21) Appl. No.: 14/478,682

(22) Filed: Sep. 5, 2014

(65) Prior Publication Data

US 2014/0379809 A1 Dec. 25, 2014

Related U.S. Application Data

(63) Continuation-in-part of application No. 13/544,955, filed on Jul. 9, 2012.

(51) Int. Cl.
| | |
|---|---|
| *G06F 15/173* | (2006.01) |
| *G06F 15/16* | (2006.01) |
| *G06Q 50/00* | (2012.01) |
| *G06F 17/30* | (2006.01) |
| *G06Q 30/02* | (2012.01) |

(52) U.S. Cl.
CPC .......... *G06Q 50/01* (2013.01); *G06F 17/30867* (2013.01); *G06Q 30/0241* (2013.01)

(58) Field of Classification Search
CPC ..... H04L 65/403; H04L 65/601; H04L 67/10; H04L 67/02; H04L 29/08099; H04L 51/14; H04L 51/16; H04L 51/32; H04L 67/20; H04L 67/22; H04L 67/26
USPC ......................................... 709/224, 204, 206
See application file for complete search history.

(56) References Cited

U.S. PATENT DOCUMENTS

| | | | | |
|---|---|---|---|---|
| 2007/0130541 | A1* | 6/2007 | Louch et al. | 715/804 |
| 2008/0071929 | A1* | 3/2008 | Motte et al. | 709/246 |
| 2008/0281832 | A1* | 11/2008 | Pulver et al. | 707/100 |
| 2013/0151602 | A1* | 6/2013 | McClelland et al. | 709/204 |
| 2013/0159926 | A1* | 6/2013 | Vainer et al. | 715/804 |
| 2014/0052540 | A1* | 2/2014 | Rajaram et al. | 705/14.66 |
| 2014/0081817 | A1* | 3/2014 | Secrist et al. | 705/35 |
| 2014/0095257 | A1* | 4/2014 | Lewis et al. | 705/7.31 |
| 2014/0101304 | A1* | 4/2014 | Webster | 709/224 |
| 2014/0330651 | A1* | 11/2014 | Klemm et al. | 705/14.66 |
| 2014/0337436 | A1* | 11/2014 | Hoagland et al. | 709/204 |
| 2014/0365581 | A1* | 12/2014 | Kennon et al. | 709/205 |
| 2015/0143279 | A1* | 5/2015 | Uliel et al. | 715/777 |

* cited by examiner

*Primary Examiner* — Karen Tang
(74) *Attorney, Agent, or Firm* — James A. Italia; Italia IP (57) ABSTRACT

A social network system includes one or more participant terminals operable to act as a client on a social network and a computer operable to act as a server on the social network and to communicate with each of the participant terminals over the social network. The computer includes: a memory configured to store a set of instructions; and a processor configured to execute the set of instructions. The set of instructions cause the processor to display categories into which content may be categorized, and to accept categorization of a user's own postings and of postings of other participants of the system. Displayed categories and icons for implementing categorization may appear on the initial page of the user. The number of items categorized in each category may be displayed to generate a profile summarizing the interests of the user having the user page.

1 Claim, 8 Drawing Sheets

SOCIAL NETWORK SYSTEM AND METHOD

CROSS-REFERENCE TO RELATED APPLICATION

This application is a Continuation-in-Part of and claims the benefit of the filing date under 35 USC 120 of patent application Ser. No. 13/544,955, filed Jul. 9, 2012, the contents of which are incorporated herein by reference.

BACKGROUND

This application relates generally to social networking sites.

SUMMARY

Social media and social networks are an increasing means for people to connect, conduct business, entertain one another, and the like. Most social media and network sites are rather basic and do not include much in the terms of rich and deep functionality. Therefore, there exists a significant need for a more robust social network.

In one embodiment, a social network system comprising: one or more participant terminals operable to act as a client on a social network; a computer operable to act as a server on the social network and to communicate with each of the participant terminals over the social network, the computer comprising: a memory configured to store a set of instructions; and a processor configured to execute the set of instructions, wherein the set of instructions cause the processor to: receive a user generated advertisement; display the advertisement on a user profile related to the user advertisement; receive an offer related to the displayed advertisement from a buying user; and transfer revenue to the user from the buying user.

In another embodiment, a method for selling items in a social network comprising: receiving a user generated advertisement; displaying the advertisement on a user profile related to the user advertisement; receiving an offer related to the displayed advertisement from a buying user; and transferring revenue to the user from the buying user.

BRIEF DESCRIPTION OF THE DRAWINGS

The drawings, when considered in connection with the following description, are presented for the purpose of facilitating an understanding of the subject matter sought to be protected.

DETAILED DESCRIPTION

Figure 1:
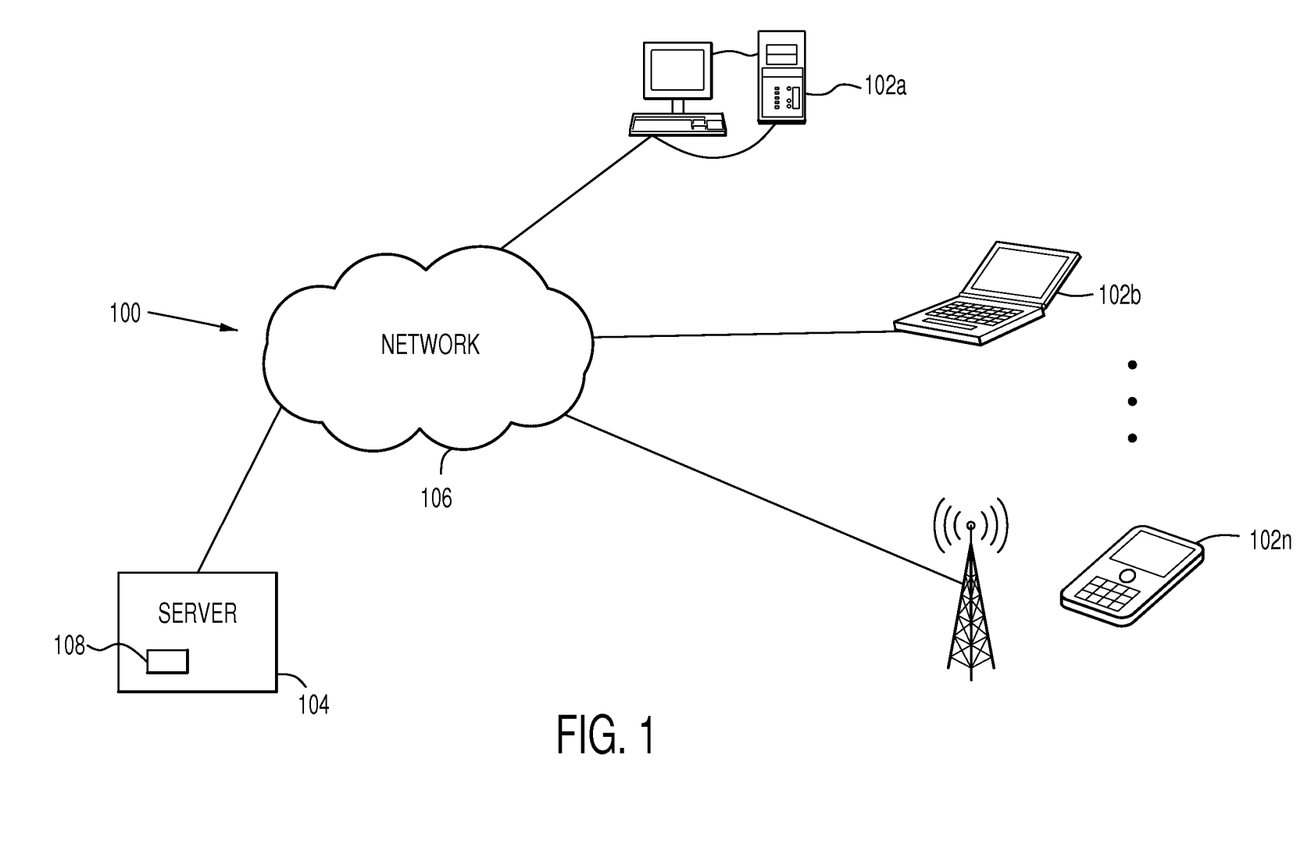
FIG. 1 depicts an illustrative social network.

Referring now to FIG. 1, a social network system 100 is depicted. The system may include one or more terminals 102*a*-102*n* (collectively 102), a server 104, and a communications network 106. The different elements and components of the system 100 may communicate with one another using wireless communications or hardwired connections, such as fiber optics, cable, DSL, telephone lines, and other similar connections.

The communications network 106 may include any number of networks capable of providing communications between the server 104 and terminals 102. For example, the communications network may be one or more, or any combination of, wireless networks, data or packet networks, publicly switched telephone networks (PSTN), etc.

The participant terminals 102 may include any suitable device operable to act as a client on a network. Illustrative terminals 102 include, but are not limited to, personal computers, desktop computers, laptop computers, servers, or any suitable telecommunications device, including, but not limited to, VoIP telephones, smart telephones or wireless devices, such as cellular telephones, personal digital assistants (PDA), communications enabled mp3 players, etc. Each terminal 102 may be configured to transmit and/or receive information to and/or from the server 104 and/or other participant terminals 102.

Search Function

Figure 2:
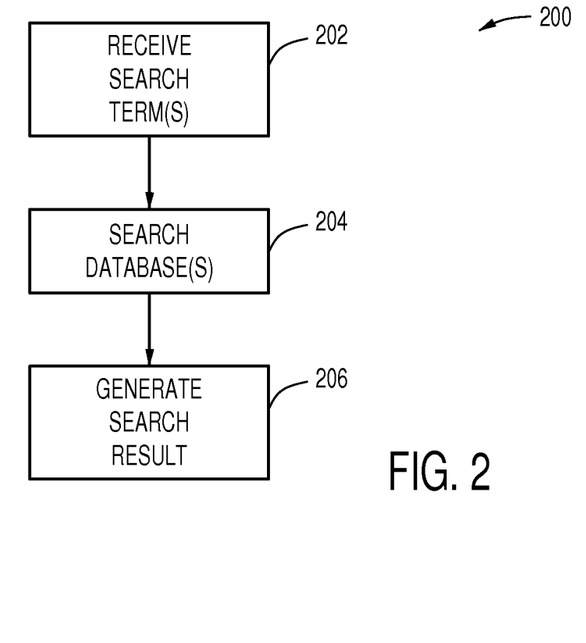
FIG. 2 depicts a search method within a social network.

With particular reference to FIGS. 1-2, the server 104 may be any server, computer or device configured to process commands from the participant terminals 102. For example, the sever 104 may be operable to receive one or more search terms from one or more terminals 102 [step 202]. A user may input one or more search terms into a text entry field displayed at one or more terminals 102. Alternatively, a user may select one or more search terms from one or more drop-down menus comprising a list or library of predetermined search terms. In one embodiment, a user may include tags or themes, which have been applied to a post on another user's profile, to further narrow the search. It will, however, be appreciated that any suitable means for receiving one or more search terms from one or more users at one or more terminals may be employed and remain within the scope of the present disclosure.

Once the search terms are received [step 202], one or more databases 108 are searched for each search term [step 204]. The database(s) 108 may be stored on the server 104 or in a separate location apart from the server 104. In one non-limiting example, the one or more databases 108 store information related to user profiles in the social network. Each database 108 may be configured to receive and/or store information from each user related to each user's profile. Each database is fully searchable and the search is not limited to any particular or narrow field. For example, and without limitation, a user may search the databases 108 for information with another user's post, tags or themes used by other user's with their posts, advertisements posted by other user's, videos posted by users, images posted by users, biographical information about users (e.g. name, location, gender, e-mail address, etc.) or any other suitable information.

Once the database(s) 108 have been searched, the server 104 may generate a search result [step 206]. In one embodiment, the search result includes the number of instances each search term has been found in each database. Additionally, in one embodiment, the search result includes a date associated with each of the instances that each search term has been found. The date may be any suitable date. The search result may be arranged in any suitable fashion. For example, and without limitation, the results may be arranged according to relevance, number of hits, by user, alphabetically, or in any other suitable fashion. The user performing the search may then browse the search results and select certain items in the results list to view in further detail.

User Sponsored Ads

Figure 3:
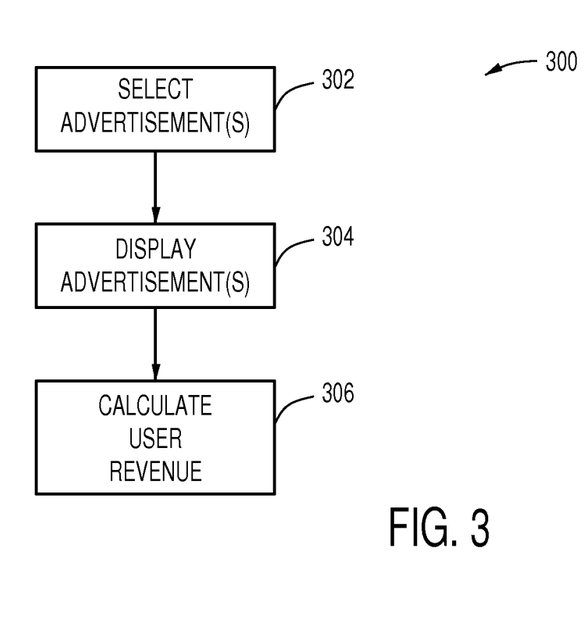
FIG. 3 depicts a sponsored advertising method within a social network.

The system 100 may also include a user sponsored ad function. With the user sponsored ad function, a user may include ads on their profile and generate revenue from such an ad. Referring now to FIGS. 1 and 3, a method for user sponsored ads is shown 300. First, the user will select one or more ads to be added to their profile [step 302]. The ads will typically be stored in one or more database(s) 108. The user may select the ads from the database(s) 108. Alternatively, a user may be presented with an opportunity to display an ad from another user or advertiser in the social network.

In one embodiment, an advertiser may receive certain data about a user to determine if the user is a suitable ad sponsor. The advertiser may gather any suitable demographic data about the user. Also, in one embodiment, an advertiser may receive information about the tags or themes a user employs with each post to determine the user's most talked about themes (see e.g. the theme section 404 in FIG. 4). An advertiser may select a user based on any suitable information, including, but not limited to target demographic data, most used themes, etc.

Figure 4:
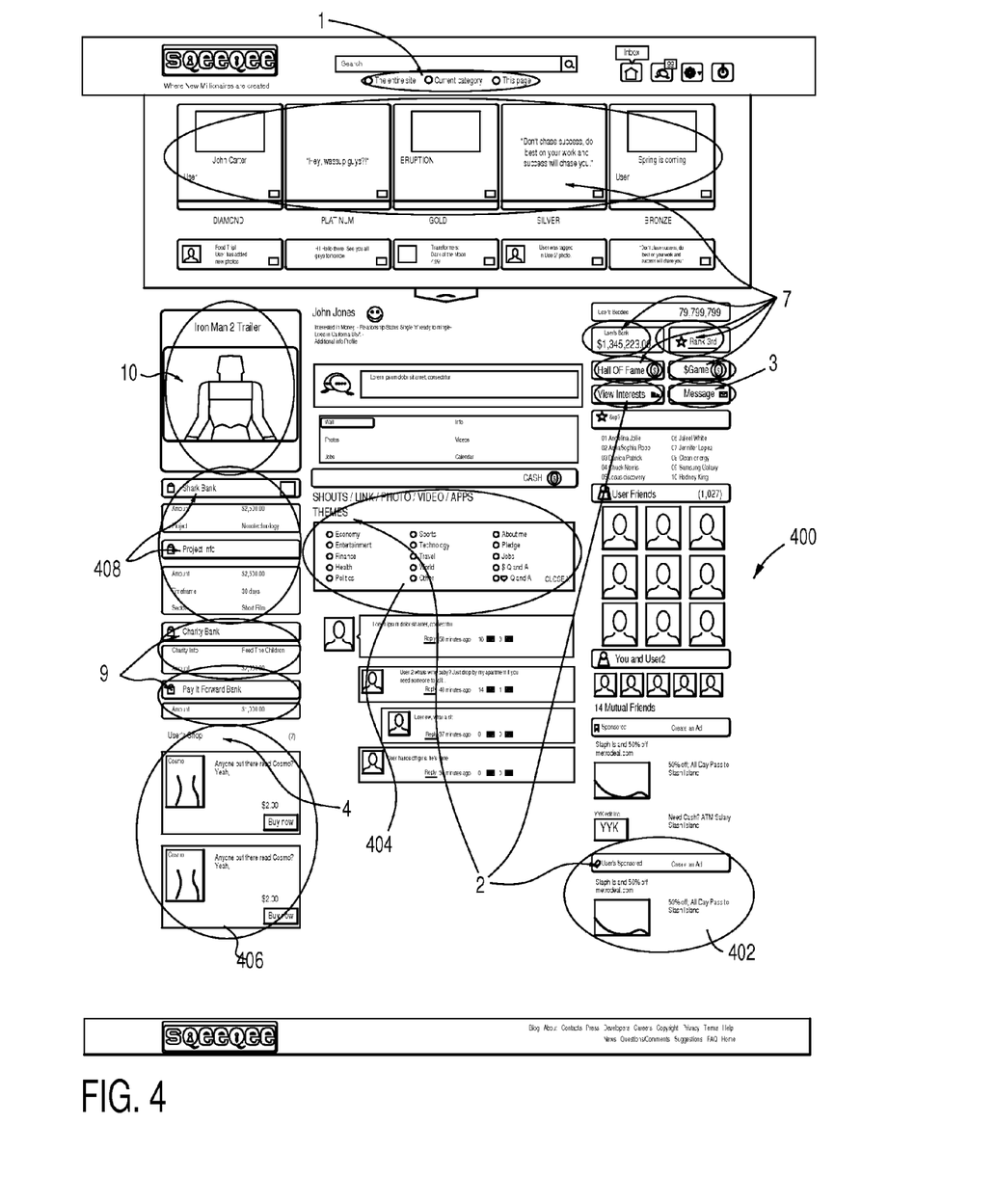
FIG. 4 depicts a user profile in a social network.

Once the ads are selected [step 302], the advertisement may be displayed in the user's profile [step 304]. In FIG. 4, a profile 400 is shown with an advertisement 402 thereon. It will be appreciated that the ad may be any type of ad (e.g. text, audio, video, etc.) and be located or displayed in any suitable manner and the present disclosure is in no way limited to the illustrative embodiment depicted herein.

Next, the user's revenue from displaying the ad may be calculated [step 306]. The user's revenue may be calculated in any suitable manner. For example, a user may collect 50% of the ad revenue from the social network host, the user may collect a predetermined amount of revenue per each click on the ad from visitors to the user's profile, the user may collect revenue based on how long the user keeps the ad on the profile, etc. It will be appreciated that the model to calculating revenue may be any suitable model and is in no way limited to the illustrative examples provided herein.

E-Mail System

Figure 5:
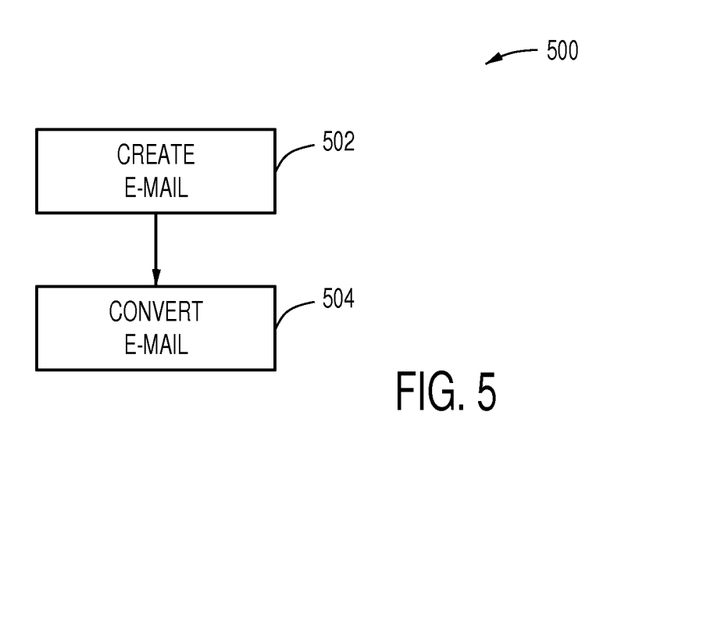
FIG. 5 depicts an email method in a social network.

The system 100 may also include an e-mail system that permits a user to e-mail a non-member directly from the user's profile. Referring now to FIG. 5, a illustrative method is shown 500. First, the user will create the contents for an email within the user's profile in the social network [step 502]. Next, the system 100 will convert the user's email to an email from the social network (e.g. user@socialnetwork.com). Thus, when the non-member receives the email and responds to it, the non-member's response will go directly to the user's profile to allow the user to view the email within the user's profile on the social network.

User Shop

Figure 6:
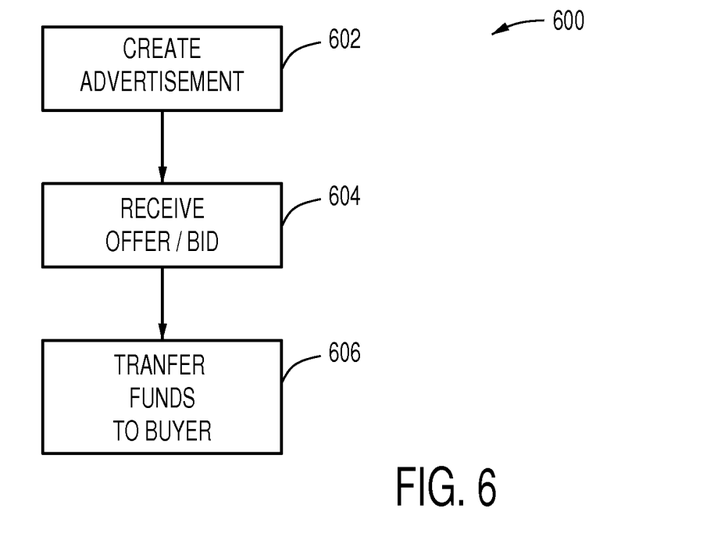
FIG. 6 depicts a user-advertising method within a social network.

The system 100 may also permit user's to sell any suitable item from their profile. Referring now to FIG. 6, an illustrative method is shown 600. First, the user will create and display an ad on their profile [step 602]. FIG. 4 illustrates an ad 406 displayed on a profile 400. Once the ad is created and displayed [step 602], the user may receive offers or bids from other users. The item may be presented as being on sale for a set price or may be auctioned. Once the sale is completed, revenue is transferred from the selling user to the buying user [step 606].

Calendar

Figure 7:
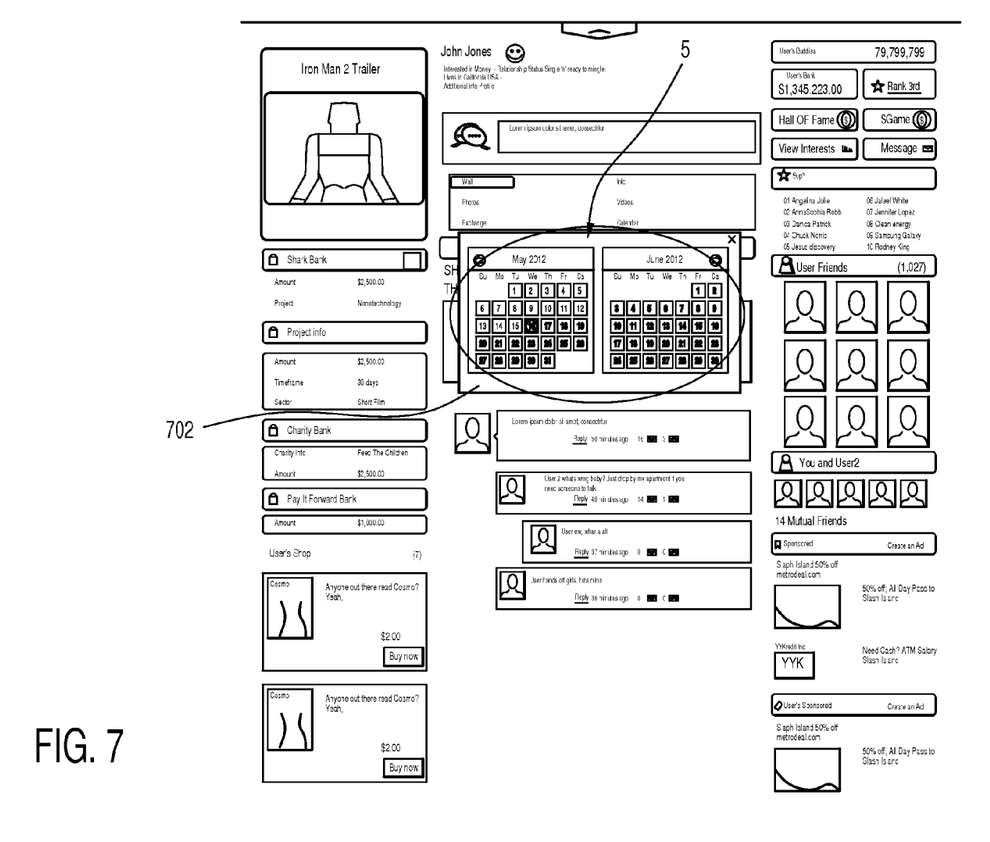
FIG. 7 depicts a calendar within a social network.

The system 100 may also be configured to allow a user to have a calendar on their profile. FIG. 7 illustrates a calendar 702 of a user's profile 700. The user may choose to make the calendar private or public. In one embodiment, the calendar may be used to show what the user posted to their profile on any given day.

Applications

Figure 8:
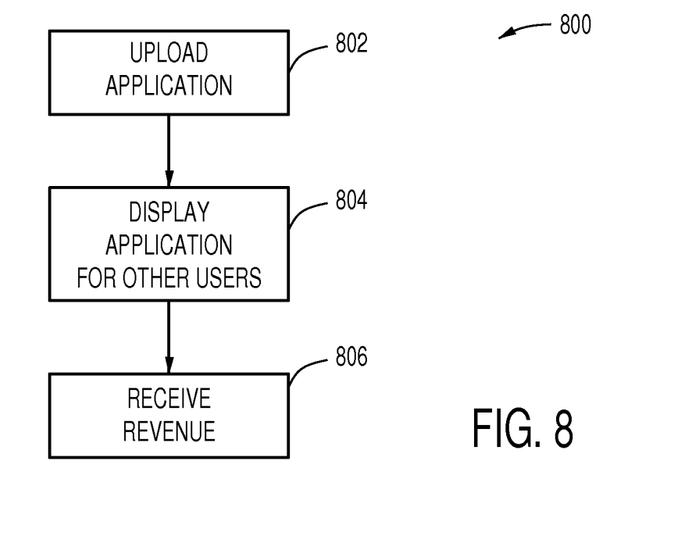
FIG. 8 depicts a method for selling applications within a social network.

The system 100 may be configured to allow a user to sell user-created applications from the user's profile. FIG. 8 illustrates a method 800. First, the user creates an application and uploads it to the user profile [step 802]. The application is displayed as being available for sale and/or download [step 804]. The application may be for any suitable platform and may be for use within the social network or for use with any other device (e.g. computer, mobile device, etc.). Once another user purchases an application from the user profile, the system will calculate revenue and distribute the revenue to the creator of the application [step 806].

Money Game

The system may also be configured to host a money-making game. This game may be a stock market game wherein users play with pretend money and purchase pretend stocks that perform similarly to real-world counterparts. User's may be given a certain amount of "money" to play with upon signing up with an option to purchase additional "money" for this game. The system may track users and display the top performers (e.g. via their profiles) over a given period of time (e.g. monthly, etc.). In one embodiment, the pretend money is redeemable for prizes and the like.

Investment Opportunities

Figure 9:
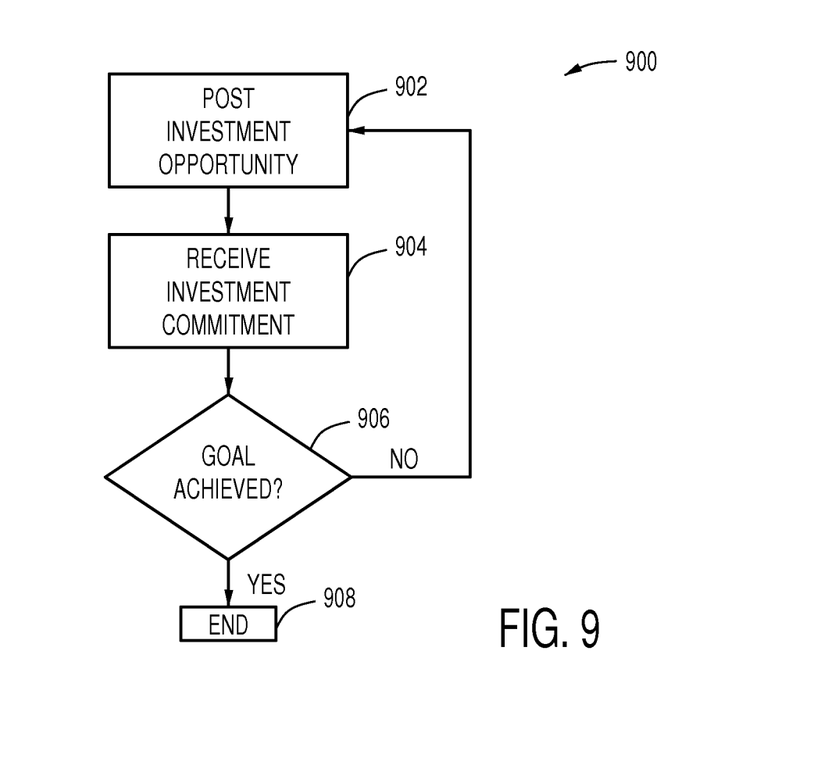
FIG. 9 depicts an investment method within a social network.

The system 100 may also allow users to post investment opportunities to their profiles. FIG. 9 shows an illustrative method 900. First, a user posts an investment opportunity with all of the information about the investment [step 902]. FIG. 4 shows such a posting 408 on a user profile 400. The investment posting typically includes what the investment is, what an investor will receive in return, how much investment is needed, etc. Next, the user receives investment commitments from other users in the social network [step 904]. It is then determined if the user has received the necessary investments [step 906]. If the user has received the necessary investments, the system 100 can distribute the funds to the user to begin the project [step 908]. If the user did not receive the necessary investments, the user may cancel the project or re-post the investment opportunity with more information about the project, less required investment to launch the project, or the even the same posting as before [step 902].

Charity Function

The system 100 may also be configured to permit user's to donate money to charities or other users. The user may search the social network for charities having profiles in the network. The user may then select to transfer funds to the charity of choice in the social network.

Alternatively, the user may choose to donate funds or other goods to another user in need. The user may search or otherwise notify users within user's network that the user is looking to "pay-it-forward" to another user. The user may then selectively donate the funds and/or goods to the user in need.

View Interest

The system 100 may include a feature that characterizes the interests, or view, of a user of the system 100. To this end, the system 100 includes a computer operable to act as a server on the social network and to communicate with each of the participant terminals over the social network, the computer including a memory configured to store a set of instructions; and a processor configured to execute the set of instructions. The set of instructions cause the processor to display a plurality of categories into which content of subject matter posted on the system, and imagery, both still (e.g., photographs) and dynamic (e.g., video, which may be combined with audio content) posted on the system may be categorized, to accept a posting of content on a user page of the social networking system, to accept a command categorizing the posting of content into one of the categories, and to determine from the number of postings within each one of the categories a characterization of the interests of a user having a user page. As employed herein, the user is a participant operating a participant terminal. Terms of participation may be set by a party organizing or operating the social networking system 100.

The social networking system 100 will be understood to provide content viewable by participants as user pages or screens (referring of course to content displayed at any one time on the screen of a monitor of a computer of one of the participants in the social networking system 100), "user page(s)" and "screen(s)" being used interchangeably herein, depending on context.

Selections of content may come from either of two sources. In one option, postings to be categorized are based on clicked selections of content by a user having a user page of content posted by others on the social networking system. In a second option, postings to be categorized are based on content posted by the user having the user page and performing the categorization himself or herself. These two options may be realized using two different user pages.

Figure 10:
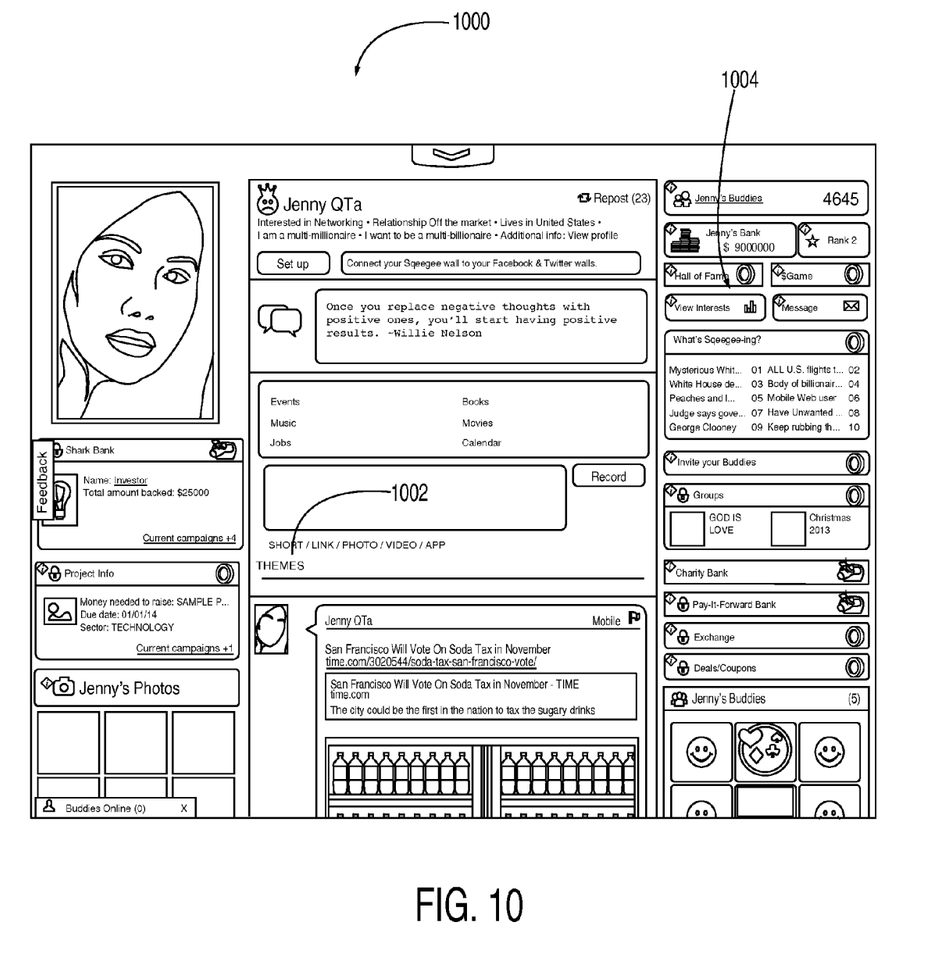
FIG. 10 depicts an opening screen of a user of the social network of FIGS. 1-9.

Turning to FIG. 10, an opening screen 1000 of plural user pages is seen to include a first invokable icon 1002 and a second invokable icon 1004 The first invokable icon 1002, if clicked on or accessed in another way, summons a listing of categories into which content posted by others may be categorized. The second invokable icon 1004, if clicked on or accessed in another way, summons another listing of categories into which content posted or selected by the user having the user page may be categorized. In the illustrated example, categorization of content of others (corresponding to icon 1002) may be called "themes". Similarly, categorization of content of the user having the user page (corresponding to the icon 1004) has been called "view interest".

The categories which may be summoned by icons 1002, 1004 may include at least two of entertainment, information technology, finance, travel and food, world news, politics, personal content relating to the user having the user page, economics, motor vehicles, sports, real estate, health, jobs, and a general category encompassing content of subject matter which the user does not wish to categorize into any of the other categories.

The initial user page, or alternatively, a subsequent user page, contains at least one invokable icon operable to accept commands categorizing designated content to be categorized. This holds for content from either of the two aforementioned optional sources.

Figure 11:
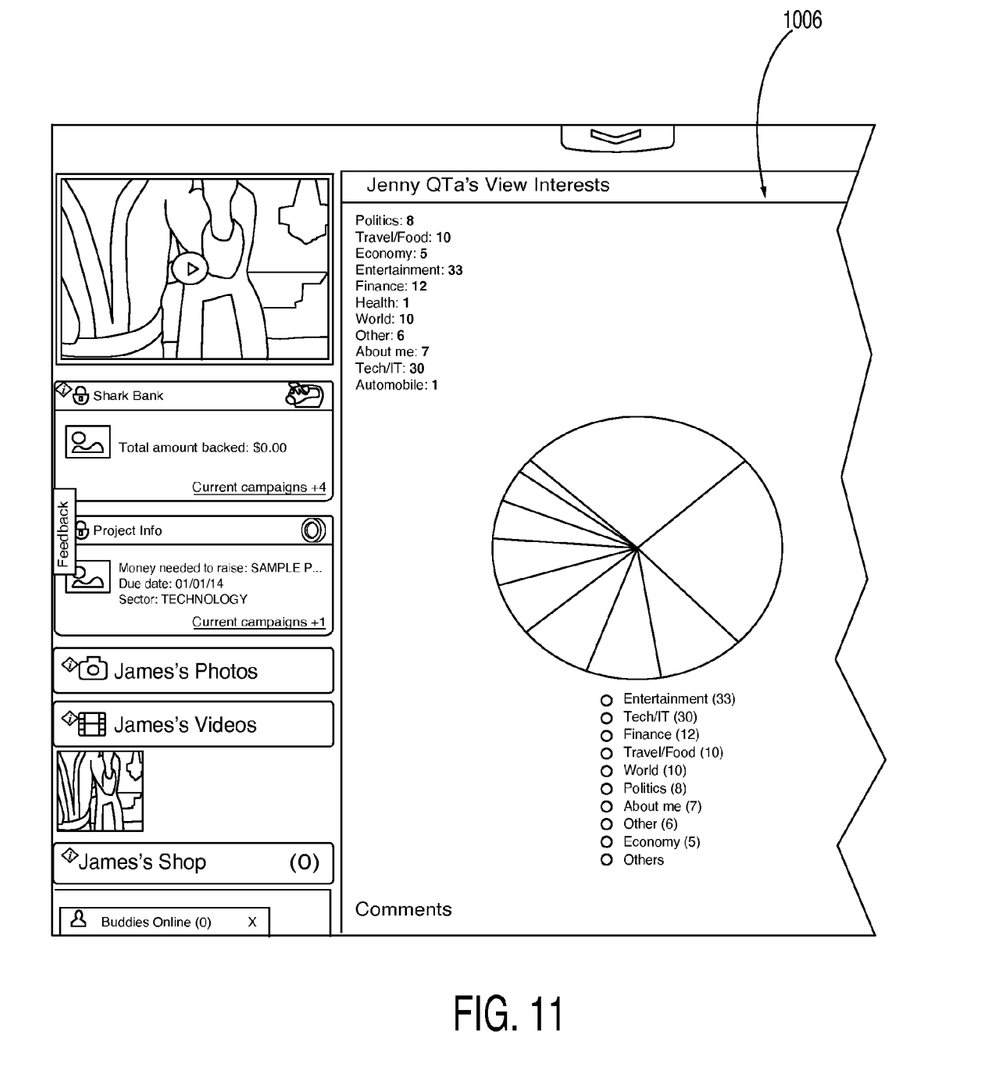
FIG. 11 depicts a subsequent screen of the user of the social network of FIGS. 1-9.

Turning now to FIG. 11, a subsequent page of the user having the user page may include a display 1006 listing the categories and also the number of postings categorized in each of the listed categories. The display 1006 may include a pie chart as a graphic device for illustrating the number of categorized postings, although obviously, other graphic as well as numerical depictions may be used.

The social networking system 100 may include computer instructions maintained at one or more servers administered or operated by the party establishing or operating the social networking system 100, which computer instructions maintain a running total of categorized postings. Alternatively, the computer instructions for maintaining the runnint total may be stored in the computer of the user having the user page, or in a third party server or computer. The user having the user page may have functionality to reset the categorized totals to zero.

In the illustrative embodiments, the server 104 includes a memory and a processor to accommodate the forgoing. However, it will be appreciated that the forgoing may be implemented in hardware, software, or a suitable combination of hardware and software, and which can be one or more software systems operating on a general purpose server platform. As used herein, a hardware system can include discrete semiconductor devices, an application-specific integrated circuit, a field programmable gate array or other suitable devices. A software system can include one or more objects, agents, threads, lines of code, subroutines, separate software applications, user-readable (source) code, machine-readable (object) code, two or more lines of code in two or more corresponding software applications, databases, or other suitable software architectures. In one exemplary embodiment, a software system can include one or more lines of code in a general purpose software application, such as an operating system, and one or more lines of code in a specific purpose software application.

While the present disclosure has been described in connection with what is considered the most practical and preferred embodiment, it is understood that this disclosure is not limited to the disclosed embodiments, but is intended to cover various arrangements included within the spirit and scope of the broadest interpretation so as to encompass all such modifications and equivalent arrangements.

What is claimed is:

1. A social network system comprising:
   one or more participant terminals operable to act as a client on a social network;
   a computer operable to act as a server on the social network and to communicate with each of the participant terminals over the social network, the computer comprising:
   a memory configured to store a set of instructions; and
   a processor configured to execute the set of instructions, wherein the set of instructions cause the processor to
   display a plurality of categories into which content of subject matter posted on the system, and imagery posted on the system is categorized,
   accept a posting of content on a user page of the social networking system,
   accept a command categorizing the posting of content into one of the categories,
   determine from the number of postings within each one of the categories a characterization of the interests of the user having the user page;
   wherein postings to be categorized are based on clicked selections of content posted by others on the social networking system;
   wherein the postings to be categorized are based on content posted by the user having the user page and performing the categorization;
   wherein the categories include at least two of entertainment, information technology, finance, travel and food, world news, politics, personal content relating to the user having the user page, economics, motor vehicles, sports, real estate, health, jobs, and a general category encompassing content of subject matter which the user does not wish to categorize into any of the other categories;
   wherein the user page includes an initial page with the necessary means to include an invokable icon operable to display a list of the categories and to accept a selection by the user having the user page categorizing each posting into one of the categories;

further including a graphic device illustrating the categories and also the number of postings categorized in each of the listed categories;

further including a non-transitory computer program product, comprising a computer usable medium having a computer readable program code embodied therein, said computer readable program code adapted to be executed to maintain a running total of categorized postings;

wherein the computer instructions for maintaining the running total may be stored in the computer of the user having the user page, or in a third party server or computer, wherein the user having the functionality to reset the categorized totals to zero; and, wherein the graphic device includes a pie chart, wherein said pie chart is comprised of sectors that each represent the categories and also the number of postings categorized in each of the listed categories as a proportion of all categorized postings prior to the last instance the user implemented the functionality to reset the categorized totals to zero.

* * * * *